No Printed Specification Available
9639X
A. H. Robbins,
Vegetable Cutter.
Patented May 6. 1836.
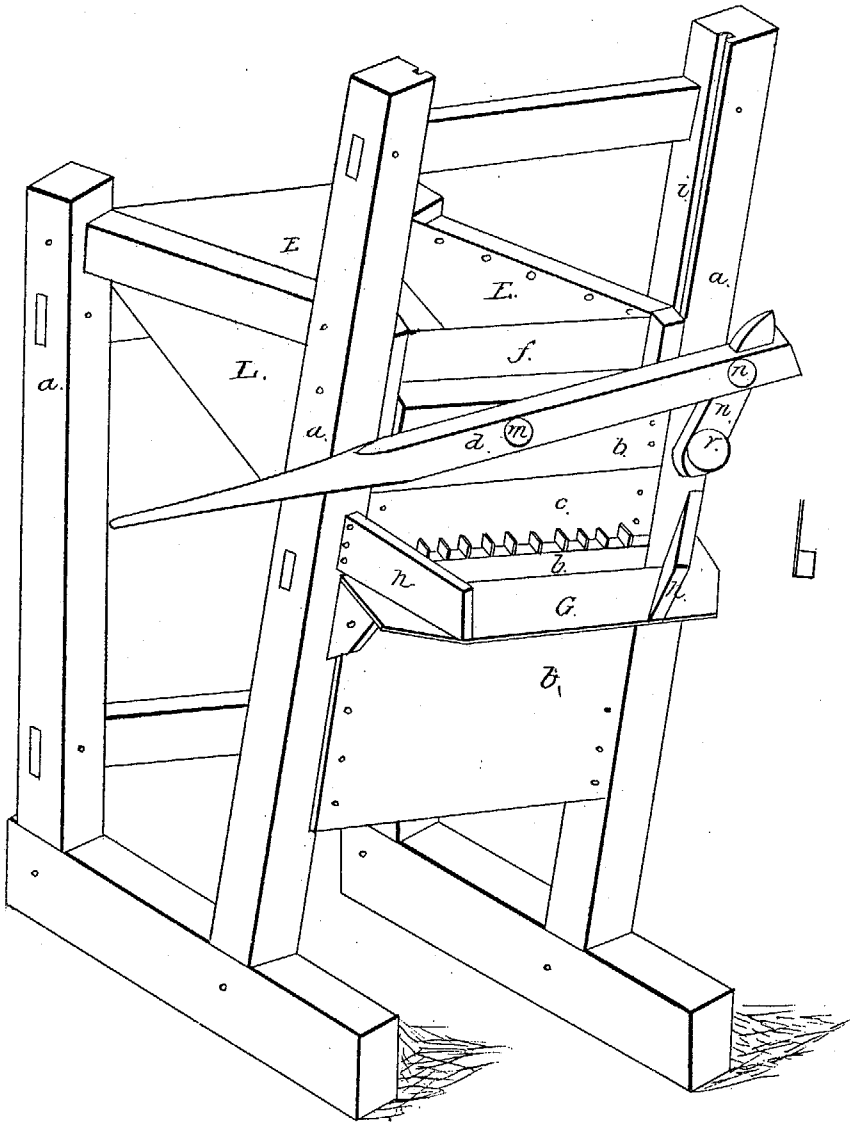
N. PETERS, PHOTO-LITHOGRAPHER, WASHINGTON, D. C.

H 9639X
May 6 1836
311

Austin H. Robbins of Denmark, N. York

Letters Patent,

The schedule referred in these letters patent and making a part of the same containing a description in the words of the said Austin H. Robbins himself of his improvement in the machine for cutting Potatoes, Turnips, mangel wurtzel, Carrots &c. for cattle and horse feed, Be it known that I Austin H. Robbins of Denmark, of the County of Lewis & State of New York have invented a new and useful Machine for cutting Potatoes, Turnips, mangel wurtzel, carrots &c. for feeding to cattle horses and other domestic animals, The drawing herewith enclosed, is a view in perspective of the model of said Machine, on a scale of half an inch to the inch of said model which is on a scale of three inches to the foot of said Machine for use (or nearly)

The principle timbers are four posts and 2 bed pieces or sills which may be 2 by 3 and a half inches square. The front posts may be 4 feet & 4 inches in length. The rear posts 3 feet 4 inches and the bed pieces or sills 2 feet 6 inches in length. each bed piece receives the foot of one front and one rear post leaving a space of 10½ inches between. The end of the bed pieces [illegible] extending forward. Three feet from where the foot of the rear post enters the bed piece is [illegible] a [illegible] about 2 inches wide and twenty inches in length, upon the upper side the opposite the opposite end of which is received by the front post, which is very considerable inclined forward as the rear post enters the bed piece without a [illegible], These timbers thus put together constitute the side frames of the Machine, The width of said Machine may be 20 inches between the posts, The sides are [illegible]
connected

9639X by 4 girts, the lower girt connecting the front posts may
enter 18½ inches (measuring on the front side) from where it
enters the bed piece, This girt may be two inches deep its
depth extending upwards from the measurement, its width may
lack about ¼ of an inch from coming out flush with the
front of the posts, The mortises in the front posts which receive
the girt may be one and one fourth inch from the front side of
the posts and a corner taken out at each end of this girt in
front of the tenon sufficient to receive a slide 1¼ inch square
The upper girt near the end of these posts must be set back
from the front so as to admit the same sized slide, The top
girt in the rear posts may be placed 2 feet 9 inches from the
foot where it enters the bed piece From this girt to the lower
end in the front posts is placed a board, the under edge placed
in the lower girt in the front posts, to which girt it is fastened,
This serves as the bottom of the hopper to which are fitted side
boards extending upwards as far as the top of the side girts
to which together with the front posts they are made fast, the
lower ends of the side boards coming within 1½ inches of the front
of the posts, The bottom board may be perforated with holes or
constructed with slats so as to keep the dirt from the feed
There is a gate or sliding frame stationed between the two
front posts, the side pieces may be 2 feet 6 inches long and
1¼ inches square near the upper end there may be framed
a cross piece 1/3 inch thick and 3 or 4 inches wide, The
tenons may pass through the side pieces ⅜ of an inch which
will serve as tongues which slide in the grooves cut on the
insides of the front posts, Near the lower end of the said
side pieces are other tongues or projections for the same object
To these side pieces about 9½ inches below the cross piece
is attached a knife about 3½ inches wide which is let
in from the front side of these pieces, 3 or 4 eighths of an
inch (where it is made fast by screws) which regulates the thickness the slice is to be cut. The edge of the knife upon the
inside is to pass in close contact with the lower end of the bottom
board which is not quite full with the front of the girt upon
which it rests, so that the knife rest near the front edge of the
girt, To prevent it from cutting into the girt something may
be attached to the inside of the post, below the gate side piece to
receive the blow, A piece of board is to be fitted in between the
knife and upper cross piece to prevent whatever may be in the hopper
from falling over the knife when down, To the side pieces below
the edge of the knife about 1/3 an inch is fastened a board 13 or 15
inches wide against which the contents in the hopper press
when the knife is raised by which means it comes in direct
contact with the edge which stands in from the board & as the
gate is pressed down the feed falls from between the edge of
the knife and the board upon a conductor below when the edge
of the knife rests, This conductor consists of a board [illegible] inches
wide fastened to the underside of said piece made fast to the
posts, leaving room for the sliding gate to pass up and down,
To prevent the dirt and gravel from working down by
the side pieces of said gate small slats are made fast to the
lower ends of the side board which serve as a defence, The gate
or sliding frame is raised up and down by means of a lever
which may be 4 feet long connected to the gate at the center
of the cross piece by means of a pin or bolt two thirds of its
distance from the handle end, The opposite end is attached to
the left side of the machine by means of a long mortise at
the end of the lever which receives a tenon which is kept
by means of a pin or bolt, all of which forms an elbow,
That part of the elbow upon which the tenon is placed is about
9 1/2 inches from the hole where it receives the pin or bolt at
the end of the lever to a hole where it is fastened by another
pin or bolt to the left front post, From the face of the knife
project several cutters at right angles with the knife 963ax

What I claim as new or as my own invention in the above des-
-cribed machine and for the use of which I ask an exclusive
privilege is the principle in [illegible] feeding and cutting at the
same operation together with the application of the gate and
lever accompanied with the knife for preparing roots &c. for
the use of domestic animals.

In witness whereof I have hereunto
subscribed my name the 18th day of February 183[illegible]

Austin H. [illegible]

Witnesses
Saml. Allen
John M. Hulbert

[illegible]

Drawing

[1141 [illegible]